United States Patent
Dakshinamurthy et al.

(10) Patent No.: US 11,255,876 B2
(45) Date of Patent: Feb. 22, 2022

(54) MEASURING A NOISE LEVEL OF AN ACCELEROMETER

(71) Applicant: INVENSENSE, INC., San Jose, CA (US)

(72) Inventors: Sriraman Dakshinamurthy, San Jose, CA (US); Matthew Julian Thompson, Beaverton, OR (US); Vadim Tsinker, Belmont, CA (US)

(73) Assignee: INVENSENSE, INC., San Jose, CA (US)

(*) Notice: Subject to any disclaimer, the term of this patent is extended or adjusted under 35 U.S.C. 154(b) by 19 days.

(21) Appl. No.: 16/824,161

(22) Filed: Mar. 19, 2020

(65) Prior Publication Data
US 2020/0300887 A1    Sep. 24, 2020

Related U.S. Application Data

(60) Provisional application No. 62/822,487, filed on Mar. 22, 2019.

(51) Int. Cl.
   *G01P 21/00* (2006.01)
   *G01P 15/125* (2006.01)
   *G01P 15/08* (2006.01)

(52) U.S. Cl.
   CPC .......... *G01P 21/00* (2013.01); *G01P 15/0802* (2013.01); *G01P 15/125* (2013.01)

(58) Field of Classification Search
   CPC ..... G01P 21/00; G01P 15/125; G01P 15/0802
   See application file for complete search history.

(56) References Cited

U.S. PATENT DOCUMENTS

| | | | |
|---|---|---|---|
| 2013/0025345 A1* | 1/2013 | Czompo | G01P 21/00 73/1.37 |
| 2019/0271717 A1* | 9/2019 | Bahreyni | G01P 15/0802 |

* cited by examiner

*Primary Examiner* — Walter L Lindsay, Jr.
*Assistant Examiner* — Andrew V Do
(74) *Attorney, Agent, or Firm* — Amin, Turocy & Watson, LLP

(57) ABSTRACT

A method of measuring noise of an accelerometer can comprise exposing the accelerometer comprising a micro-electro-mechanical system (MEMS) component coupled to an application specific integrated circuit component (ASIC), to an external environmental input, with the MEMS component being configured to provide a first output to the ASIC based on the external environmental input. The method can further comprise estimating a first noise generated by operation of the MEMS component, and replacing the first output provided to the ASIC from the MEMS component, with a second output generated by a MEMS emulator component, with the second output comprising the first noise. Further, the method can include generating an output of the accelerometer based on the second output processed by the ASIC.

13 Claims, 10 Drawing Sheets

MEASURING A NOISE LEVEL OF AN ACCELEROMETER

CROSS-REFERENCE TO RELATED APPLICATION

This patent application claims priority to U.S. Provisional Patent Application No. 62/822,487, filed on Mar. 22, 2019, this application hereby being incorporated by reference herein.

TECHNICAL FIELD

This disclosure generally relates to embodiments for a device comprising a micro-electro-mechanical systems (MEMS), and more particularly to an accelerometer comprising a MEMS.

BACKGROUND

Accelerometers, like all devices, can be fabricated with different designs, processes, and components. As such, when accelerometers are provided, the devices are provided with specifications describing their characteristics and operation. One example characteristic of an accelerometer is termed the noise level of the device, this being in some circumstances, the amount of output noise that could be expected in the absence of mechanical excitation, e.g., also termed residual noise, and broadband noise. In some circumstances, acceleration forces that are less than the noise level will not be resolvable by the accelerometer.

Depending on different factors, the noise level of an accelerometer can be different for each fabricated device. One approach that can be used to determine a noise level for each fabricated accelerometer is to measure the output of the device when no acceleration input is applied to the device. Problems with this approach can occur however, when, for a variety of reasons, an accelerometer to be tested cannot be isolated from environmental acceleration input, e.g., when the device is exposed to environmental noise vibrations from equipment at the fabrication facility of the device.

Consequently, conventional approaches to determining the noise level of an accelerometer can have some drawbacks, some of which may be noted with reference to the various embodiments described herein.

SUMMARY

The following presents a simplified summary of one or more of the embodiments of the present invention in order to provide a basic understanding of the embodiments. This summary is not an extensive overview of the embodiments described herein, e.g., it is intended to neither identify key or critical elements of the embodiments nor delineate any scope of embodiments or the claims. A purpose of this summary is to present some concepts of the embodiments in a simplified form as a prelude to the more detailed description that is presented later. It will also be appreciated that the detailed description may include additional or alternative embodiments beyond those described in the Summary section.

Generally speaking, the present disclosure recognizes and addresses, in at least certain embodiments, the issue of measuring a noise level of an accelerometer in the presence of environmental noise. For example, in one or more embodiments, a method of measuring noise of an accelerometer can comprise exposing the accelerometer comprising a micro-electro-mechanical system (MEMS) component coupled to an application specific integrated circuit component (ASIC), to an external environmental input, with the MEMS component being configured to provide a first output to the ASIC based on the external environmental input. The method can further comprise estimating a first noise generated by operation of the MEMS component, and replacing the first output provided to the ASIC from the MEMS component, with a second output generated by a MEMS emulator component, with the second output comprising the first noise. Further, the method can include generating an output of the accelerometer based on the second output processed by the ASIC.

In another example, disclosed systems and methods can provide for an accelerometer comprising a sensing component and a MEMS component associated with the sensing component. In some embodiments, the MEMS component can receive environment noise and external acceleration, and the sensing component can output a first signal associated with a first noise, when the MEMS component is disabled from the sensing component. The accelerometer can further comprise a MEMS emulation component to emulate the MEMS component by operations including generating a second signal associated with a second noise. In some embodiments, an output signal of the accelerometer can comprise the first signal and the second signal.

In one or more embodiments, other disclosed systems and methods can provide for an accelerometer comprising a capacitive sensing component coupled to a MEMS component configured to output a first signal to the capacitive sensing component based on received external environmental input. The accelerometer can further comprise a switch configured to disable the output of the first signal to the capacitive component. The accelerometer can further provide accelerometer output based on the capacitive sensing component and an estimate of Brownian noise generated by operation of the MEMS component, with a noise level of the accelerometer corresponding to the provided accelerometer output.

In additional embodiments, accelerometer can further comprise a noise estimating component configured to generate the estimate of the Brownian noise, and this noise estimating component can be configured to generate the estimate of the Brownian noise by providing a step signal to the MEMS component. In additional embodiments, the noise estimating component can be configured to determine a resonant frequency and a quality factor of the MEMS component by applying a least square fit method to a response by the MEMS component to the step signal, then generate the estimate of the Brownian noise based on the resonant frequency.

In a variation, the accelerometer can further comprise a MEMS emulator component that can be configured to provide, based on the disabling of the output of the first signal, a second signal to the ASIC comprising an emulated output of the MEMS component. In this variation, the output component can be configured to provide the accelerometer output based on the emulated output of the MEMS component. In this example, the emulated output of the MEMS component can be based on the estimate of the Brownian noise, and output of the accelerometer can be based on the emulated output of the MEMS component, e.g., without exposure of the MEMS component to the external environmental input.

In one or more embodiments, the output component can be further configured to provide accelerometer output further based on electrical noise generated by operation of the ASIC. In addition, determining the noise level of the accelerometer can be conducted during production of the accelerometer, e.g., with the external environmental input comprising vibrational noise of a production facility where the accelerometer was assembled.

In other embodiments, a method can expose an accelerometer comprising a micro-electro-mechanical system (MEMS) component coupled to an application specific integrated circuit (ASIC) component to an external environmental input, wherein the MEMS component is configured to provide a first output to the ASIC based on the environmental input. The method can further comprise disabling the first output from being provided to the ASIC from the MEMS component, resulting in an output produced by the accelerometer. Further, the method can comprise determining a noise level of the accelerometer based on a combination of the output produced by the accelerometer and an estimate of Brownian noise generated by operation of the MEMS component.

In additional embodiments, the method can further comprise, generating, by a component comprised in the accelerometer, the estimate of Brownian noise generated by operation of the MEMS component, and emulating a second output produced by the MEMS component, resulting an emulated MEMS output, with the disabling the first output from being provided to the ASIC comprising replacing the first output with the emulated MEMS output, resulting on the noise level of the accelerometer being based on the emulated MEMS output. The method, in additional embodiments, can provide the emulated MEMS output to the ASIC is based on the estimate of the Brownian noise, resulting in the output produced by the accelerometer being based on the estimate of the Brownian noise.

In other embodiments, the method can emulate the second output produced by the MEMS component by emulating output of the MEMS component without exposure of the MEMS component to the external environmental input. In additional or alternative embodiments of the method, the determining the noise level of the accelerometer is further based on electrical noise generated by operation of the ASIC.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Reference throughout this specification to "one embodiment," "an embodiment," or "one or more embodiments" can be an indication that a particular feature, structure, or characteristic described in connection with the embodiment is included in at least one embodiment. Thus, the appearances of the phrase "in one embodiment," "in an embodiment," and "in one or more embodiments" in various places throughout this specification are not necessarily all referring to the same embodiment. Furthermore, the particular features, structures, or characteristics may be combined in any suitable manner in one or more embodiments.

Figure 1:
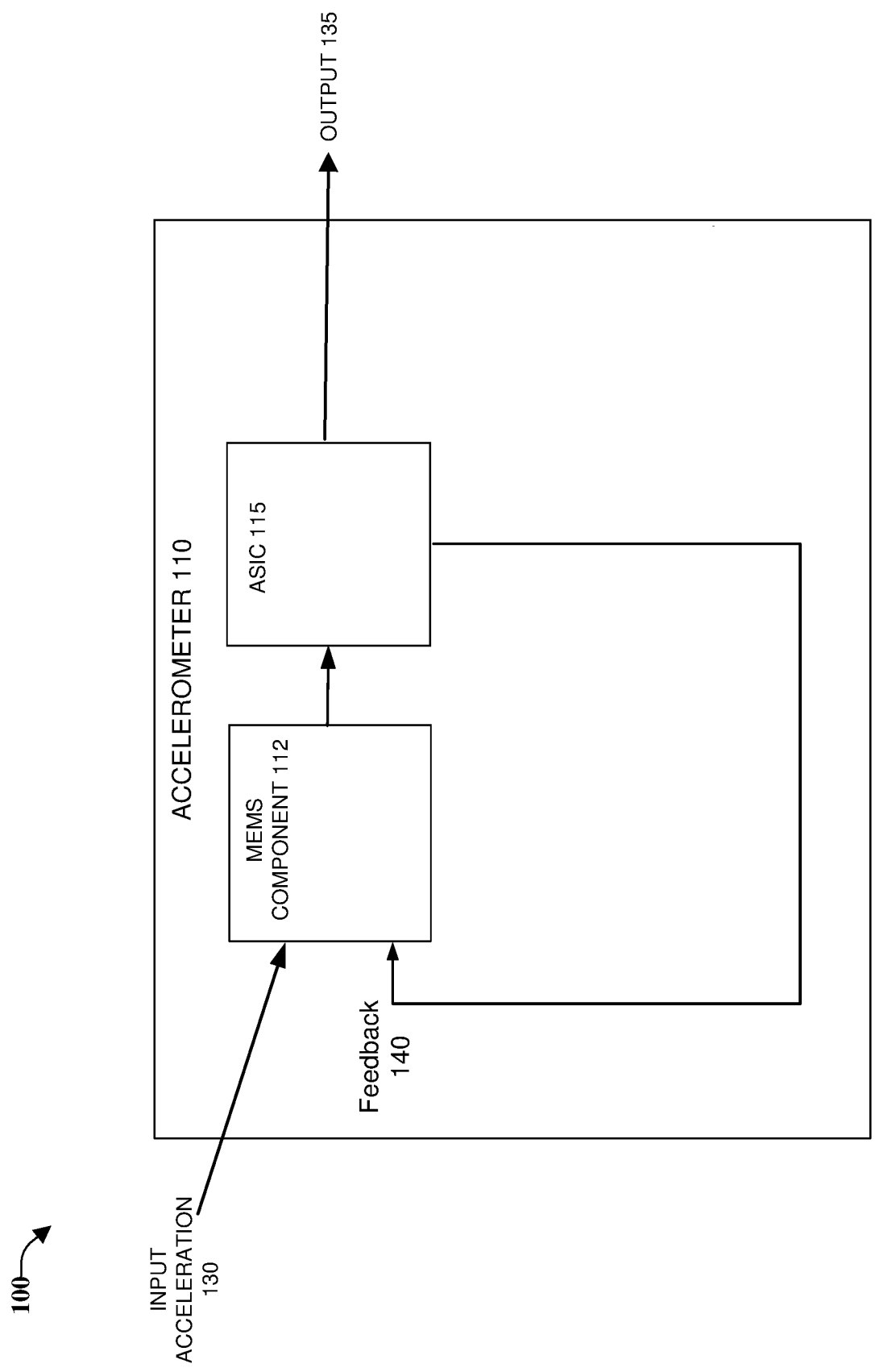
FIG. 1 depicts a block diagram of an example system, including an accelerometer, in accordance with one or more embodiments.

FIG. 1 depicts a block diagram of an example system 100, including accelerometer 110, in accordance with one or more embodiments. For purposes of brevity, description of some elements and/or processes of embodiments discussed further below are omitted in this discussion of FIG. 1. In accordance with one or more embodiments, accelerometer 110 comprises MEMS component 112 coupled to ASIC 115. As depicted, MEMS component 112 can sense input acceleration 130, and provide output to ASIC 115 which can generate accelerometer output 135 based on input acceleration 130. In one or more embodiments, feedback 140 can comprise signals corresponding to input data for a self-test of MEMS component 112.

As would be appreciated by one having skill in the relevant art(s), given the disclosure herein, in some implementations, accelerometer 110 can measure acceleration based on the movement of an actuator of MEMS component 112, and the measurement of that movement by ASIC 115 can be used to generate a signal that reflects the acceleration force counteracting the inertia of the actuator. Characteristics of the accelerometer that can affect different embodiments are discussed further with FIG. 7 below, these including, but not limited to, the area of MEMS component 112

(e.g., determined according to the layout of accelerometer 110) and the thickness of the actuator used to sense acceleration.

As an electro-mechanical component designed to measure force, output 135 of accelerometer 110 can include noise from at least three different sources, e.g., as described below with FIGS. 3 and 4, environmental noise, noise from the mechanical elements of MEMS component 112 (e.g., Brownian noise), and noise from the electrical elements of the component, e.g., ASIC 115 and an analog to digital converter (not shown). As described further herein, one or more embodiments can alter the ways that accelerometer 110 is affected by different types of noise.

Figure 2:
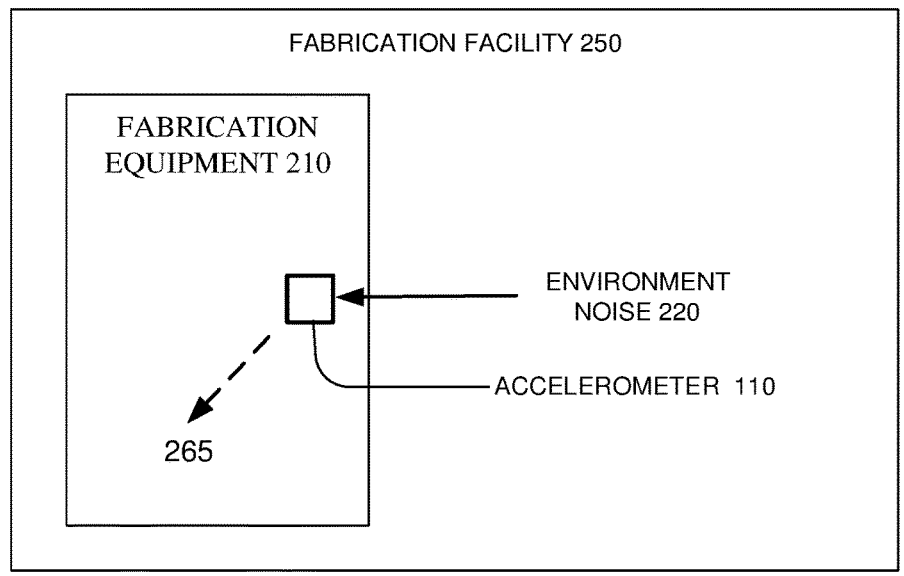
FIG. 2 depicts a block diagram of an example facility for fabrication of accelerometer 110, in accordance with one or more embodiments.

FIG. 2 depicts a high-level block diagram 200 of an example facility for fabrication of accelerometer 110, in accordance with one or more embodiments. For purposes of brevity, description of like elements and/or processes employed in other embodiments is omitted. Fabrication equipment 210 can be include in fabrication facility 250 which can, based on operation of fabrication equipment 210 and other sources, can be subject to environmental noise. In this example, accelerometer 110 is depicted in proximity to fabrication equipment 210. FIG. 2 is intended to depict accelerometer 110 in an environment where it is exposed to environmental noise, e.g., in fabrication facility 250.

It should be noted that, as discussed herein, vibration can be expressed in units of gravitational constant "g," where 1 $g=9.81$ m/s$^2$, e.g., a milli-g (mg) being a thousandth of the gravitational constant and a micro-g (μg) being a millionth of the gravitational constant. In one or more embodiments, fabrication facility 250 can have periodic, or random disturbances, with an example maximum environmental noise being up to 100 mg, with varying frequency components. In an example noise level that can be a specification value for one or more accelerometer instances described herein, is 5 μg, though this value can be larger or smaller than this example, depending on implementation specific factors. One having skill in the relevant art(s), given the description herein, will appreciate that other environments can provide similar circumstances, and can be a setting for the use of one or more embodiments discussed herein. Accelerometer 110 and fabrication equipment 210 are not depicted to scale.

As noted in the Background section above, one problem with the conventional production of accelerometers 110 is that testing the components in proximity to fabrication equipment in fabrication facility 250 can be difficult, given the ambient forces (e.g., environment noise 220) to which the component can be exposed, at the time when testing the component can be advantageous. One solution can be to remove 265 accelerometer 110 from environment noise 220, but this can cause extra time and cost to the fabrication process. One or more embodiments can facilitate some types of testing of accelerometer 110, even while in the presence of environment noise 220.

Figure 3:
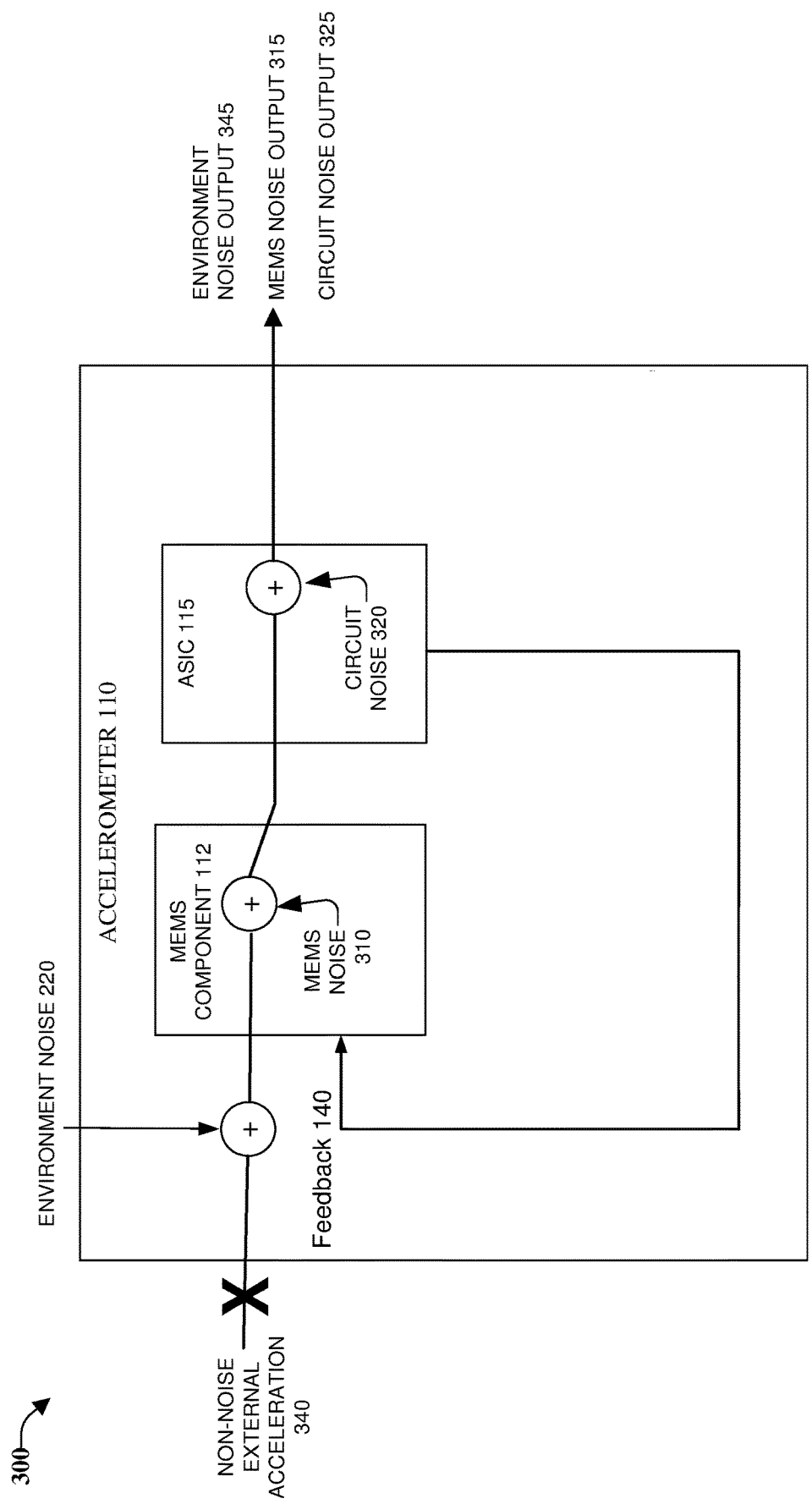
FIG. 3 depicts a more detailed block diagram of an example system, including an accelerometer and labels for sources of different types of noise that can affect output of the accelerometer, even in the absence of input acceleration to be tested, in accordance with one or more embodiments.
Figure 4:
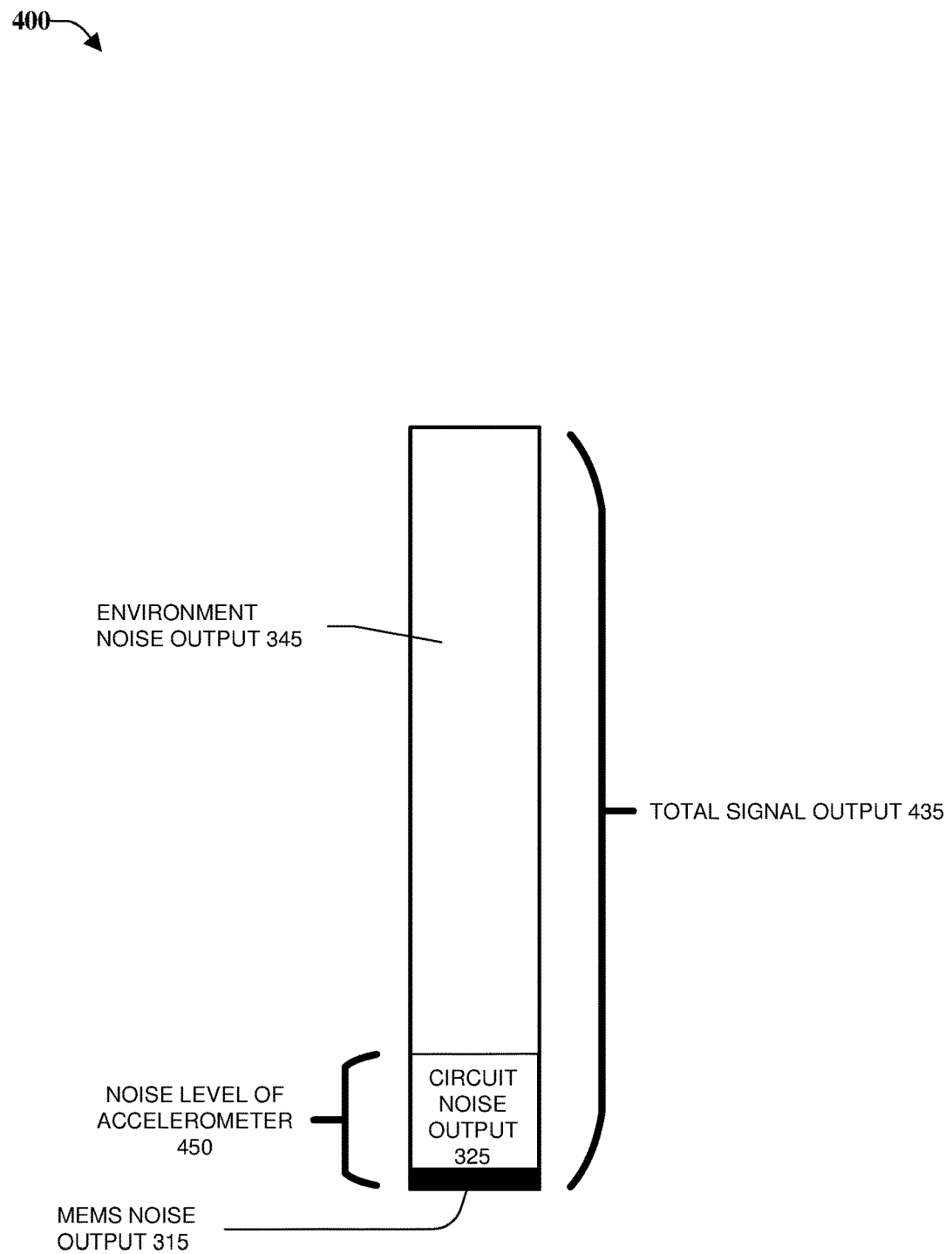
FIG. 4 provides, in accordance with one or more embodiments, a chart to illustrate the relationships between different noise sources and a noise level of and accelerometer.

FIGS. 3 and 4 provide an overview of different sources of noise that can be generated by the operation of accelerometer 110. As noted above, one or more embodiments can be used to measure or estimate noise generated by accelerometer 110 without the influence of environment noise 220, e.g., a noise level of accelerometer 110 that can be expected with accelerometer 110 held still. FIG. 3 depicts a more detailed block diagram of an example system 300, including accelerometer 110 and labels for sources of different types of noise that can affect output 135 of the accelerometer, even in the absence of non-noise external acceleration 340 to be tested, in accordance with one or more embodiments. For purposes of brevity, description of like elements and/or processes employed in other embodiments is omitted. It should be noted that, in FIGS. 3, 5, and 6, an "X" is used to depict an example where a path to a component or a component is disabled, in accordance with one or more embodiments. For example, in FIGS. 3, 5, and 6, the "X" on the path between non-noise external acceleration 340 and environment noise 220 describes that, in circumstances discussed below, one or more embodiments can block accelerometer 110 from being exposed to non-noise external acceleration 340. Similarly, in FIGS. 5 and 6, MEMS emulator component 510 has an "X" inside the component that indicates that, in some example circumstances discussed in detail below, one or more embodiments can disable MEMS emulator component 510.

System 300 includes accelerometer 110 isolated from the mechanical excitement of external acceleration 340, e.g., for testing to determine a noise rating of the device. In this example, this isolation can be effected by having accelerometer 110 not moving, albeit exposed to environment noise 220 of fabrication facility 250. Accelerometer 110 includes MEMS component 112 coupled to ASIC 115, and arranged to detect input acceleration 130, if any is present. ASIC 115 receives output from MEMS 112 component and can provides output 135 of accelerometer 110.

In addition to various components of accelerometer 110, FIG. 3 also depicts different sources of noise included in output 135 of accelerometer 110. FIG. 4 provides, in accordance with one or more embodiments, chart 400 to illustrate the relationships between different noise sources and noise level of accelerometer 450, e.g., a specification of accelerometer 110. Chart 400 can include total signal output 435, this value representing portions of output 135 of accelerometer 110 before the use of one or more embodiments described herein. The example of total signal output 435 includes a depiction of output 135 of accelerometer 110 in the presence of substantial environment noise 220 and without the influence of input acceleration 130 caused by movement of accelerometer 110, e.g., accelerometer 110 held still for testing in fabrication facility 250 under the influence of environment noise 220 caused by fabrication equipment 210.

As depicted, along with the sensing of non-noise input acceleration 130 (not depicted in this example), environment noise 220 can be sensed and reflected in output 135 as environmental noise output 345, with output 135 being depicted as total signal output 435 in FIG. 4. Further, with the operation of MEMS component 112, MEMS noise 310 can be added to the output provided to ASIC 115 and reflected as MEMS noise output 315 in output 135. In addition, circuit noise 320 can be included in output 135, and be reflected as circuit noise output 325 in this output. As depicted total signal output includes an aggregation of MEMS noise output 315, circuit noise output 325, and environmental noise 345. Notwithstanding this non-limiting example, it should be noted that in different implementations the noise outputs can be combined differently, e.g., not adding up as depicted, and one or more embodiments do not rely upon the aggregate relationship depicted for operation.

The further description of the sources of the different types of noise can be illustrative of different concepts described herein. In one or more embodiments of MEMS component 112, movement of an actuator of MEMS component 112 can be measured and transformed into a signal by ASIC 115 in different ways. One approach can use a capacitive sensor to measure movement of the actuator and provide this output to ASIC 115, where this output can be transformed into a voltage signal proportional to the amount of movement (e.g., mass displacement) of the actuator induced by different forces. An example force that can cause movement of the actuator, and that accelerometer 110 is designed to measure, is input acceleration 130. As discussed herein, other forces can also cause movement of the actuator, resulting in MEMS noise 310. With respect to the sources of MEMS noise 310, as discussed with some examples herein, MEMS noise 310 can result from interference that can affect mechanical movement of parts of MEMS component 112, e.g., interference that can cause movement of the actuator to occur, even without movement of accelerator 110 or the presence of environment noise 220.

In an example where one or more embodiments can be utilized, MEMS noise 310 can be caused movement of the actuator by the random motion of particles colliding with the actuator, e.g., by Brownian movement of the actuator. In one or more embodiments, the process by which movement of the actuator can measured can be so precise, that even these minor forces can be detected by, and affect the accuracy of, accelerometer 110.

As noted above, one of the specifications for which accelerometer 110 is tested is termed the noise level of the component, and some definitions of noise level include the noise that can be expected in output 135 attributable to this Brownian movement of the actuator, e.g., Brownian noise. Thus, in one or more embodiments, while environment noise 220 of fabrication facility 250 is sought to be removed from the tested noise level, MEMS noise 310 from Brownian motion affecting MEMS component 112, is sought to be included in some noise level measurements. As described below, one or more embodiments can estimate an amount of noise caused by MEMS noise 310, and use this estimate, to generate a portion of the noise level of accelerometer 110. It should be noted that, as described with FIG. 6 below, MEMS noise 310 can be used to test other aspects of accelerometer 110, e.g., electronic noise generated by the operation of ASIC 115 can be assessed based on an input signal that includes Brownian noise. To facilitate this process, as described with FIGS. 5-8 below, one or more embodiments can advantageously utilize a component that emulates the output of MEMS component 112 (e.g., including an estimate of Brownian noise attributable to the actuator) to measure electronic noise generated by the operation of ASIC 115, e.g., circuit noise output 325.

Figure 5:
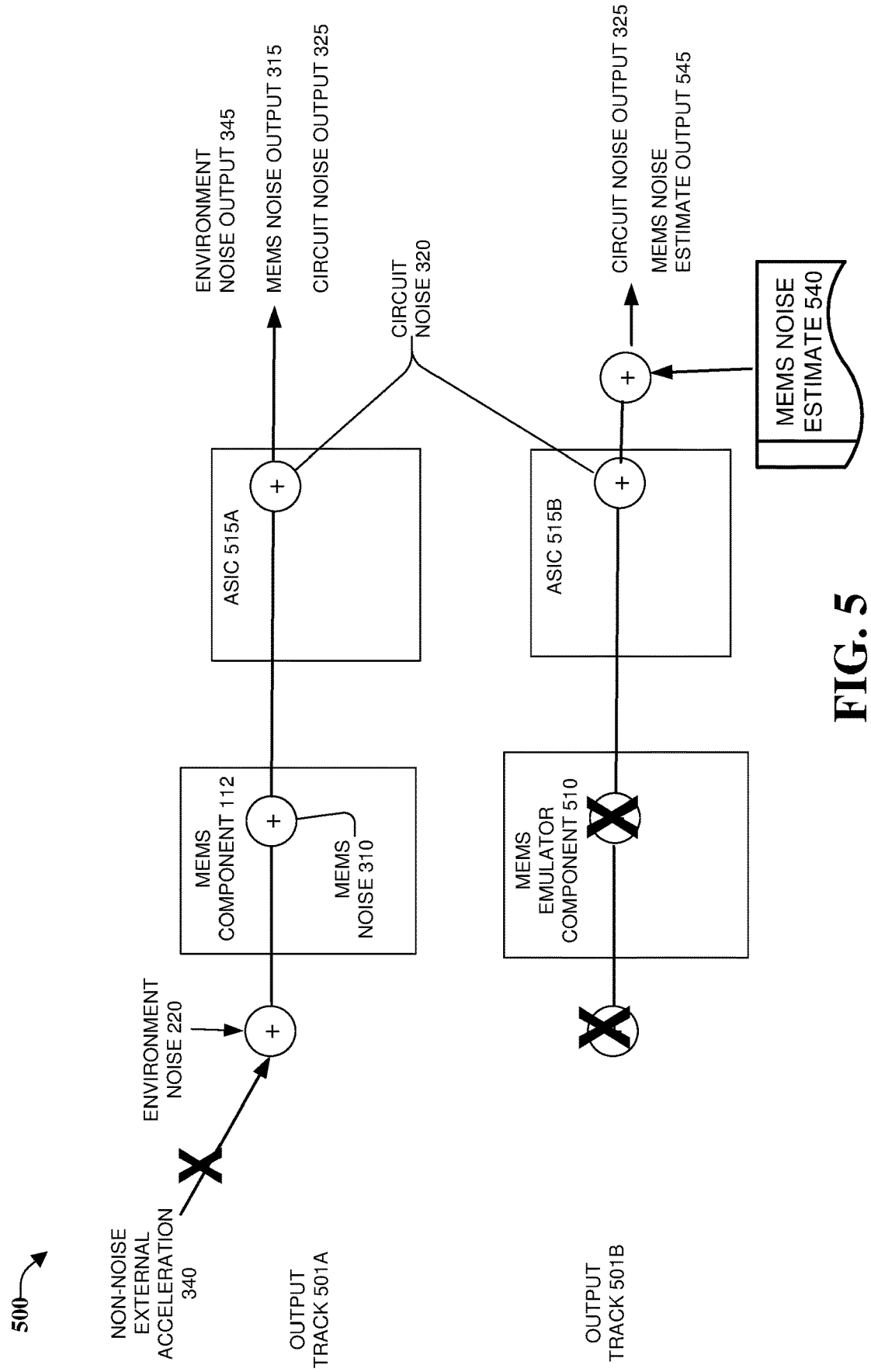
FIG. 5 depicts a block diagram of a system that can facilitate a measurement of a noise level of accelerometer without interference from environmental noise, in accordance with one or more embodiments.

FIG. 5 depicts a block diagram of a system 500 that can facilitate a measurement of a noise level of accelerometer without interference from environment noise 220, in accordance with one or more embodiments. For purposes of brevity, description of like elements and/or processes employed in other embodiments is omitted.

System 500 includes two alternative output tracks 501A-B. Output track 501A can describe the conventional example discussed above, of a non-moving accelerometer 110 exposed to environmental noise, e.g., at fabrication facility 250 or other environment, e.g., in an attempt to measure a noise level of accelerometer 110. Output track 501B can be used to implement one or more embodiments described herein, using an example of a non-moving accelerometer exposed to environment noise 220 (e.g., at fabrication facility 250) and yet accurately tested to determine a noise level of accelerometer 450, e.g., without interference from environment noise 220. It should be noted that FIG. 5 depicts output tracks, and not a block diagram of accelerometer 110, with an example block diagram that can implement output track 501B being depicted with FIG. 7 below.

Output track 501A can include MEMS component 112 exposed to environment noise 220, and subject to MEMS noise 310, e.g., based on Brownian motion of the actuator (not shown). Output from MEMS component 112, can be processed by ASIC 510A, and this processing by ASIC 510A can generate circuit noise 320 added to output based on environment noise 220, and MEMS noise 310. In this simplified example, ASIC 515A provides the total signal output 435 of accelerometer 110, including MEMS noise output 315, circuit noise output 325, and environmental noise output 345.

As an alternative to output track 501A, output track 501B can disable MEMS component 112 and replace the output of MEMS component 112 with output generated by MEMS emulator component 510. This can result, in some implementations, in a portion or all of the output of MEMS component 112 being replaced with the output of MEMS emulator component 510. This output of MEMS emulator component 510 can be provided to ASIC 515B for processing in accordance with normal operation of ASIC 515B, e.g., with the generation of circuit noise 320 and the inclusion in the output of accelerometer 110.

In addition to circuit noise output 325 generated by the processing by ASIC 515B of the emulated output generated by MEMS emulator component 510, by the processes described below, the output of accelerometer 110 can include MEMS noise estimate output 545 attributable to estimated MEMS noise 310 that would have been generated by MEMS component 112. As depicted, MEMS noise estimate 540 can be added to the output of ASIC 515B noise output to represent a total noise output from ASIC 515B. As discussed with FIG. 8 below, MEMS noise estimate can be generated using different approaches, and by different components of embodiments.

In one or more embodiments, approaches utilized to generate MEMS noise estimate 540 can generate an estimate that is similar to MEMS noise output 315, and thus result in a generation of circuit noise 320 that is similar to the circuit noise generated by ASIC 515B, both of these noise values being separated, in this approach, from interference from environment noise 220. It should further be noted that, in conventional output track 501B, MEMS noise output 315 and circuit noise output 325 are included, but not identified and split as noise contributors, while in contrast, with output track 501B, at least these two noise contributors can be identified separately. One having skill in the relevant art(s), given the description herein, will appreciate that having these two noise sources separately identifiable can facilitate the design of accelerometers 110 that not only have a particular noise level, but also have a particular mix of noise sources within the output noise produced.

It should be noted that, in some definitions of the noise level of accelerometer 110 determined by output track 501B (e.g., circuit noise output 325 with MEMS noise estimate output 545) corresponds to the noise level of accelerometer 450 depicted above with FIG. 4. It should also be noted that, in some implementations, both MEMS noise 310 and circuit noise 320 can advantageously be generated for individual fabricated instances of accelerometer 110, e.g., noise level of accelerometer 450 can be measured using approaches described herein for individual fabricated instances. This individual testing is also discussed further below, with the discussion in FIG. 8 of MEMS noise estimate 540 and the operation of MEMS emulator component 510.

Figure 6:
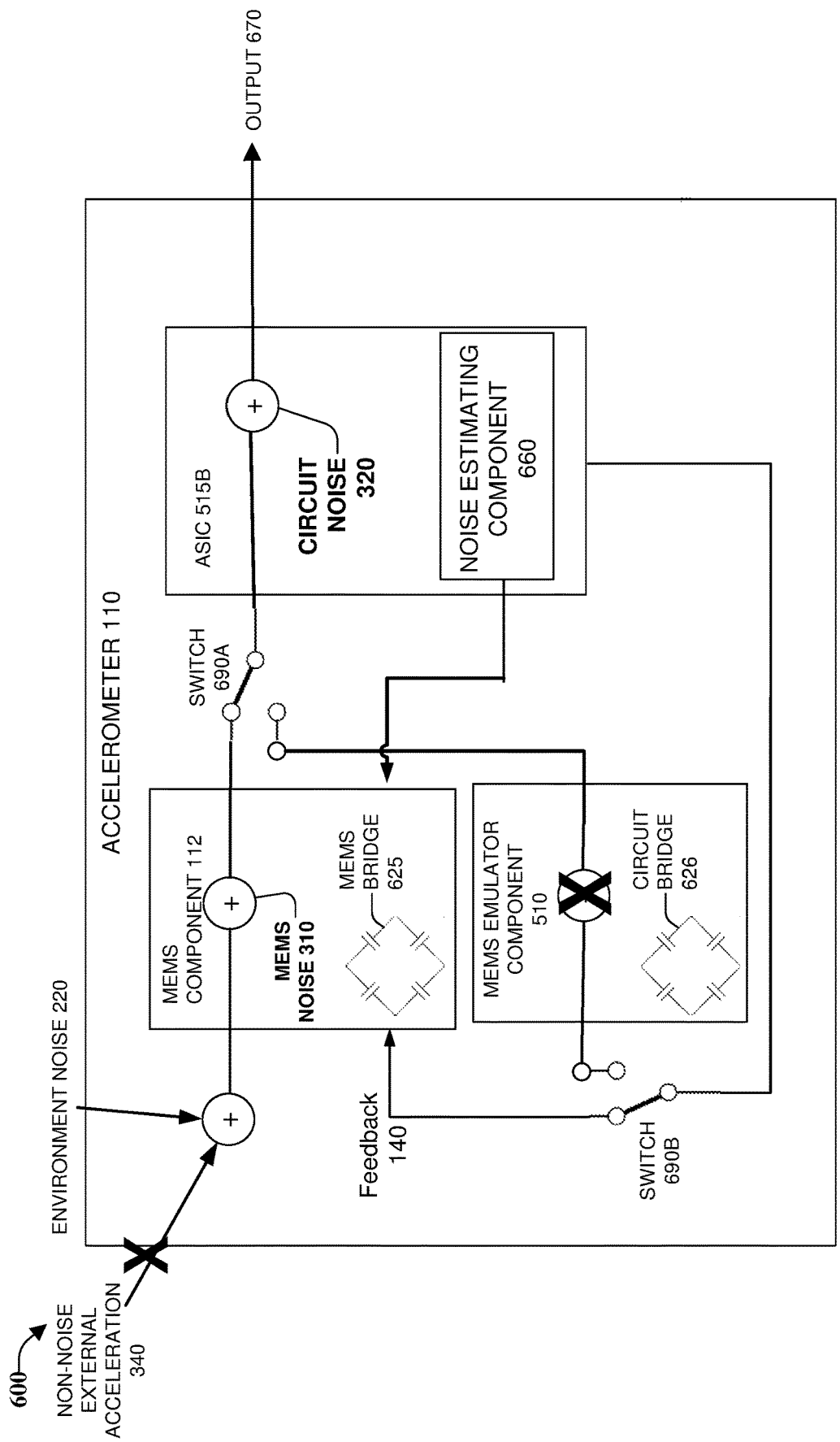
FIG. 6 depicts a more detailed block diagram of a system that can facilitate a reduction or elimination of environmental noise included in the output of an accelerometer, in accordance with one or more embodiments.

FIG. 6 depicts a more detailed block diagram of a system 600 that can facilitate a reduction or elimination of environment noise 220 included in the output 670 of accelerometer 110, in accordance with one or more embodiments.

For purposes of brevity, description of like elements and/or processes employed in other embodiments is omitted.

Accelerometer 110 includes MEMS component 112, ASIC 515B, MEMS emulator 510 and noise estimating component 660. MEMS component 112 and MEMS emulator 510 include MEMS bridge 625 and circuit bridge 626 respectively. MEMS component 112 and ASIC 515B are subject to MEMS noise 310 and circuit noise 320 respectively and MEMS emulator component 510 is shown as not being subject to MEMS noise 310. Switches 690A-B are depicted placed in a circuit of accelerometer 110 so as to switch between outputs of MEMS component 112 and MEMS emulator 510 being provided to ASIC 515B, e.g., as depicted with output tracks 501A-B of FIG. 5, respectively.

It would be apparent to one having skill in the relevant art(s), given the description herein will appreciate that MEMS emulator 510 can improve the measurement of circuit noise 320 generated by ASIC 515B, e.g., because, by emulating the output signal of a normally functioning MEMS component 112, MEMS emulator 510 can facilitate the analysis of ASIC 515B in a setting that is similar to a setting where accelerometer 110 will be operated. In some implementations, this similarity can improve the determination of the noise level of accelerometer 450, e.g., because of the similar setting in which ASIC 515B is tested.

In some implementations of MEMS component 112, acceleration can be sensed, and output to be provided to ASIC 515B can be generated based on a bridge of capacitors tuned to identify movement of an actuator, e.g., MEMS bridge 625 showing symbols of four interconnected capacitors. To emulate the output of MEMS component 112, in one or more embodiments, a similar bridge of capacitors (e.g., circuit bridge 626) can be designed and tuned so as to produce output similar to MEMS bridge 625, but without sensing any accelerative forces, e.g., environment noise 220 and non-noise external acceleration 340. In some implementations, circuit bridge 626 can be tuned to match the capacitance of MEMS component 112. Additionally, in one or more embodiments, circuit bridge 626 can be tuned so as to emulate (e.g., match the capacitance of) specific instances of MEMS bridge 625, e.g., for testing of individual accelerometers 110 for a noise level.

As noted above with FIG. 5, one or more embodiments of MEMS emulator component 510 can utilize, in output track 501B, a generated MEMS noise estimate 540 to facilitate emulation of MEMS component 112. One type of noise that can be estimated and used to facilitate emulation of MEMS component 112 is Brownian noise, discussed above. One way that MEMS noise estimate 540 can be generated is by noise estimating component 660. As depicted in FIG. 6, this component can be implemented as a part of ASIC 515B. It should be appreciated that, in alternative embodiments, different aspects of the noise estimating process can be implemented by other components of accelerometer 110. In another embodiment, noise estimating component 660 can reside in a test equipment outside the accelerometer 110, e.g., MEMS noise estimate 540 can be generated outside of accelerometer 110 (not shown) and provided for use by MEMS emulator component 510. Example approaches to estimating Brownian noise for MEMS component 112 are detailed below.

Figure 7:
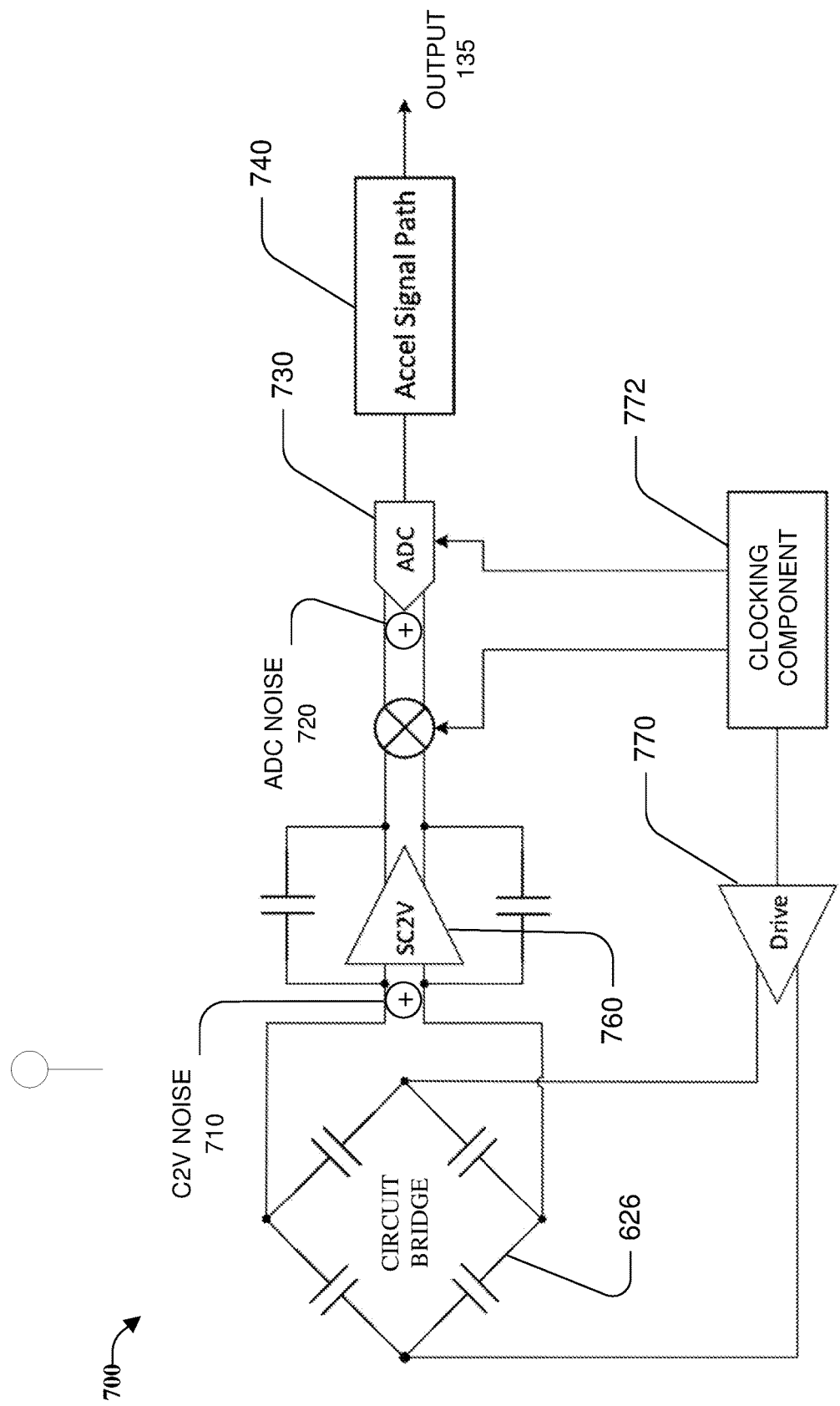
FIG. 7 depicts a more detailed block diagram of a system that can facilitate a reduction in noise included in the output of an accelerometer, in accordance with one or more embodiments.

FIG. 7 depicts a more detailed block diagram of a system 700 that can facilitate a reduction in noise included in the output of accelerometer 110, in accordance with one or more embodiments. For purposes of brevity, description of like elements and/or processes employed in other embodiments is omitted.

In an alternative approach to implementing one or more embodiments, instead of utilizing an emulation of MEMS component 112 signals (e.g., by utilizing switching to MEMS emulator 510), an output of drive component 770 (e.g., via clocking component 772) of accelerometer 110 can be set to common mode voltage, with a small drive amplitude, e.g., amplitude that can reduce the output of MEMS component 112 generated by accelerative forces.

It should further be noted that, in one or more embodiments, to improve the determination of circuit noise 320, parasitic remains of MEMS emulator 510 can be routed through the same switched capacitor readout component (e.g., SC2V 760), thus incorporating C2V noise 710 into output 135. In addition, analog to digital converter 730 can be utilized to measure ADC noise 720, and incorporating other accelerometer signal path 740 components can provide similar benefits.

Figure 8:
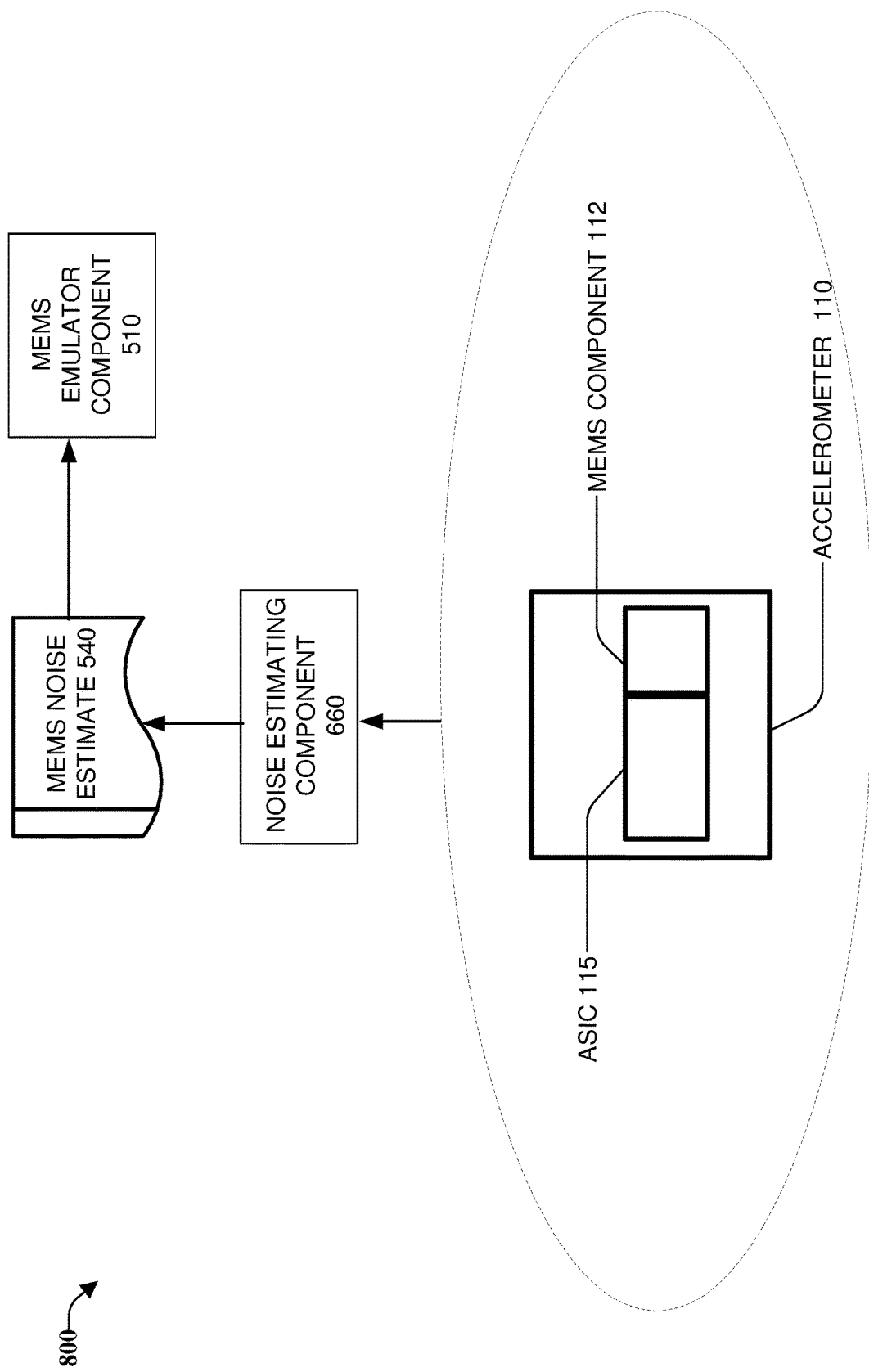
FIG. 8 depicts a non-limiting system of different components aspects of accelerometer that can be used to generate mems noise estimate, in accordance with one or more embodiments.

FIG. 8 depicts a non-limiting system 800 of different components aspects of accelerometer 110 that can be used to generate mems noise estimate 540, in accordance with one or more embodiments. For purposes of brevity, description of like elements and/or processes employed in other embodiments is omitted. System 800 includes accelerometer 110, noise estimating component 660, and MEMS emulator 510, in accordance with one or more embodiments. Accelerometer 110 includes ASIC 115 and MEMS component 112 that utilizes the actuator to sense acceleration forces. As depicted, noise estimating component 660 can receive information corresponding to characteristics of accelerometer 110, and utilize this information to generate MEMS noise estimate 540.

As noted above, one of the ways that one or more embodiments can generate a noise level of accelerometer 450 is by isolating accelerometer 110 from mechanical input and measuring the output of accelerometer 110 generated by ASIC 115 and other components in the accelerator signal path 740. As further noted above, one way that one or more embodiments can facilitate an accurate measurement of noise generated by the non-mechanical components of accelerometer 110 is to provide input to ASIC 115 that emulates output that would be received from MEMS component 112 in a standard use of the device. One having skill in the relevant art(s), given the description herein, would appreciate that in some circumstances, increasing the differences between the signal generated by MEMS emulator 510 signal and the signal that would be produced by MEMS component 112 in the same circumstances (e.g., without acceleration input) can increase the likelihood that the measured value of circuit noise 320 and other noise from accelerator signal path 740 will differ from the actual noise level value.

One or more embodiments can generate an estimate of Brownian noise ($N_{BRN}$) for accelerometer 110 by using different parameters based on characteristics of accelerometer 110. In a non-limiting example these parameters can include the area (A) of MEMS component 112 (e.g., determined according to the layout of accelerometer 110) and the thickness of the actuator (H). Additional parameters can include the resonant frequency ($\omega_n$) and the quality factor (Q) of MEMS component 112.

$$N_{BRN} = \sqrt{\frac{4k_b T}{m} \frac{\omega_n}{Q}}$$

where $m = \rho_{Si} A H$ $$N_{BRN} = \sqrt{\frac{4k_b T}{\rho_{Si} A H} \frac{\omega_n}{Q}}$$

With the above sample approach, (kb) corresponds to the Boltzmann constant and T corresponds to the temperature of accelerometer at time of testing. In one or more embodiments, $\omega_n$ and Q can be determined by providing a step signal to MEMS component 112 and applying a least square fit method to the response by MEMS component 112 to the step signal. One having skill in the relevant art(s), give the description herein, will appreciate that, an external frequency tracking circuit can be used, for accelerometer 110, to compute the values of $\omega_n$ and Q.

It should be noted that, as depicted in FIG. 6, noise estimating component 660 can be a component of accelerometer 110 along with MEMS emulator 510. To facilitate the determination of Brownian noise by these components, certain elements of the formulas above can be provided with the fabrication of accelerometer 110 (e.g., A and H) or, if specific to the testing environment, measured (e.g., T being measured by a temperature sensor of accelerometer 110) or provided as parameters when testing is triggered.

Based on the above arrangement, it should be appreciated that one or more embodiments can use the approaches described above to facilitate the testing of individual accelerometers 110 without external testing resources other than a way to trigger the testing process and read the output provided.

Figure 9:
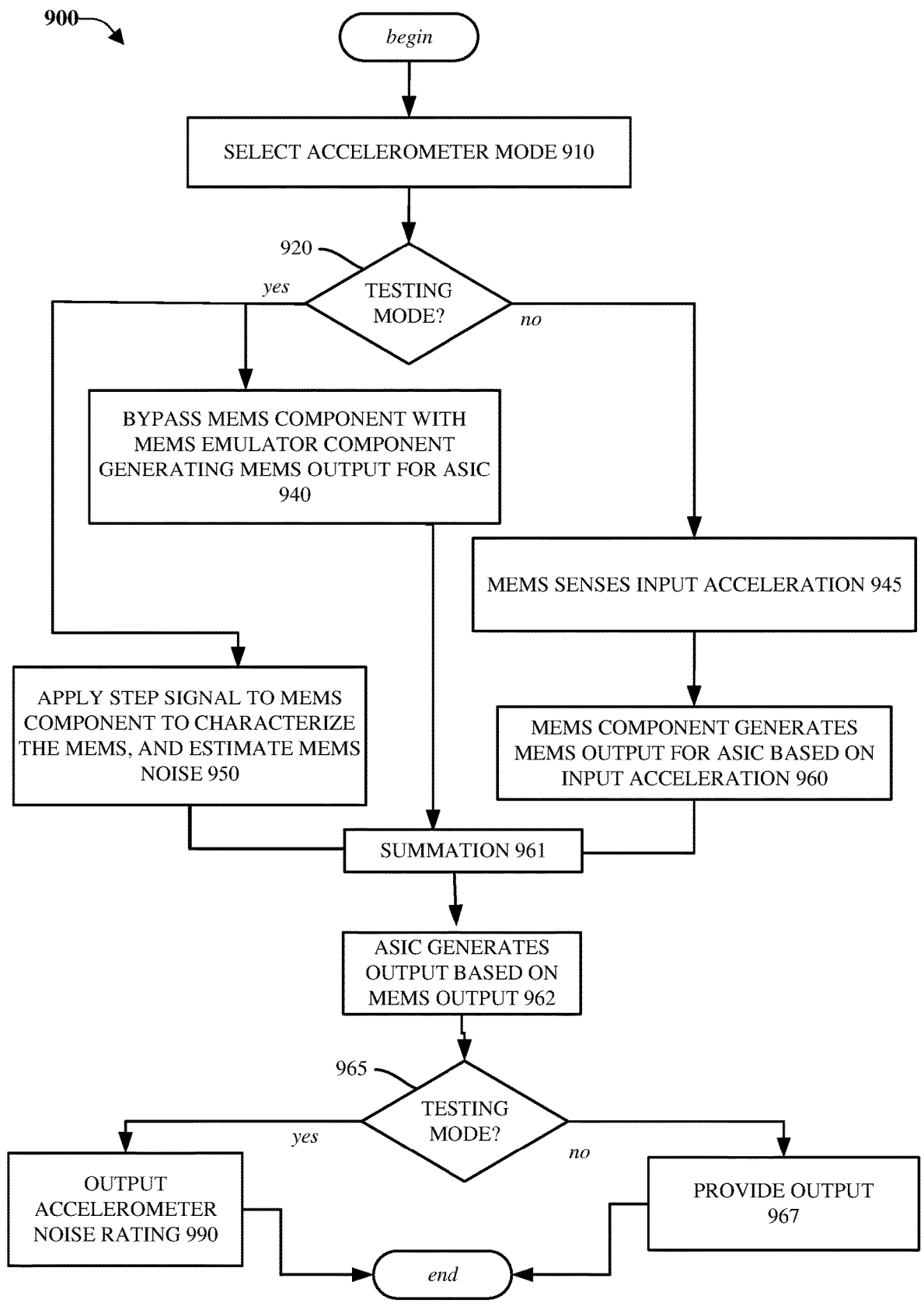
FIG. 9 illustrates an example flow diagram for a method that can facilitate determining a noise level of accelerometer, in accordance with one or more embodiments.

FIG. 9 illustrates an example flow diagram for a method 900 that can facilitate determining a noise level of accelerometer 110, in accordance with one or more embodiments. For purposes of brevity, description of like elements and/or processes employed in other embodiments is omitted.

At 910 an accelerator mode is selected, e.g., normal operation mode or testing mode. At 920, when testing mode is enabled operations move to 940 where MEMS component 112 is bypassed (e.g., by switches 690A-B of FIG. 6) with MEMS emulator component 510 generating MEMS output for ASIC 115. Also, when testing mode is enabled, at 950, a step signal is applied to MEMS component 112 to determine characteristics of MEM component 112 in order to estimate MEMS noise, e.g., MEMS noise estimate 540. With MEMS component 112 bypassed, instead of signals generated based on forceful movement of an actuator, input to ASIC 115 is provided by MEMS emulator component 510 and MEMS emulator component 510 can generate emulated MEMS output for ASIC 115.

Returning to 920, when testing mode is not enabled, operations move to 945 where, by normal operation of accelerometer 110, MEMS component 112 senses input acceleration (e.g., including environment noise 220, if present), and at 960 MEMS component 112 can generate output to be provided to ASIC 115.

At 962, after a summation 961 of output from either the test mode or normal mode, ASIC 115 can generate output based on input provided by the test mode or the normal operation of accelerometer 110, as described above. At 965, when testing mode is enabled the output 135 of ASIC 115 can be provided as a noise rating of accelerometer 110. Alternatively, at 965, when normal mode is enabled, the output of ASIC 115 can be provided as a measurement of acceleration measured by MEMS component 112 in normal operation.

Figure 10:
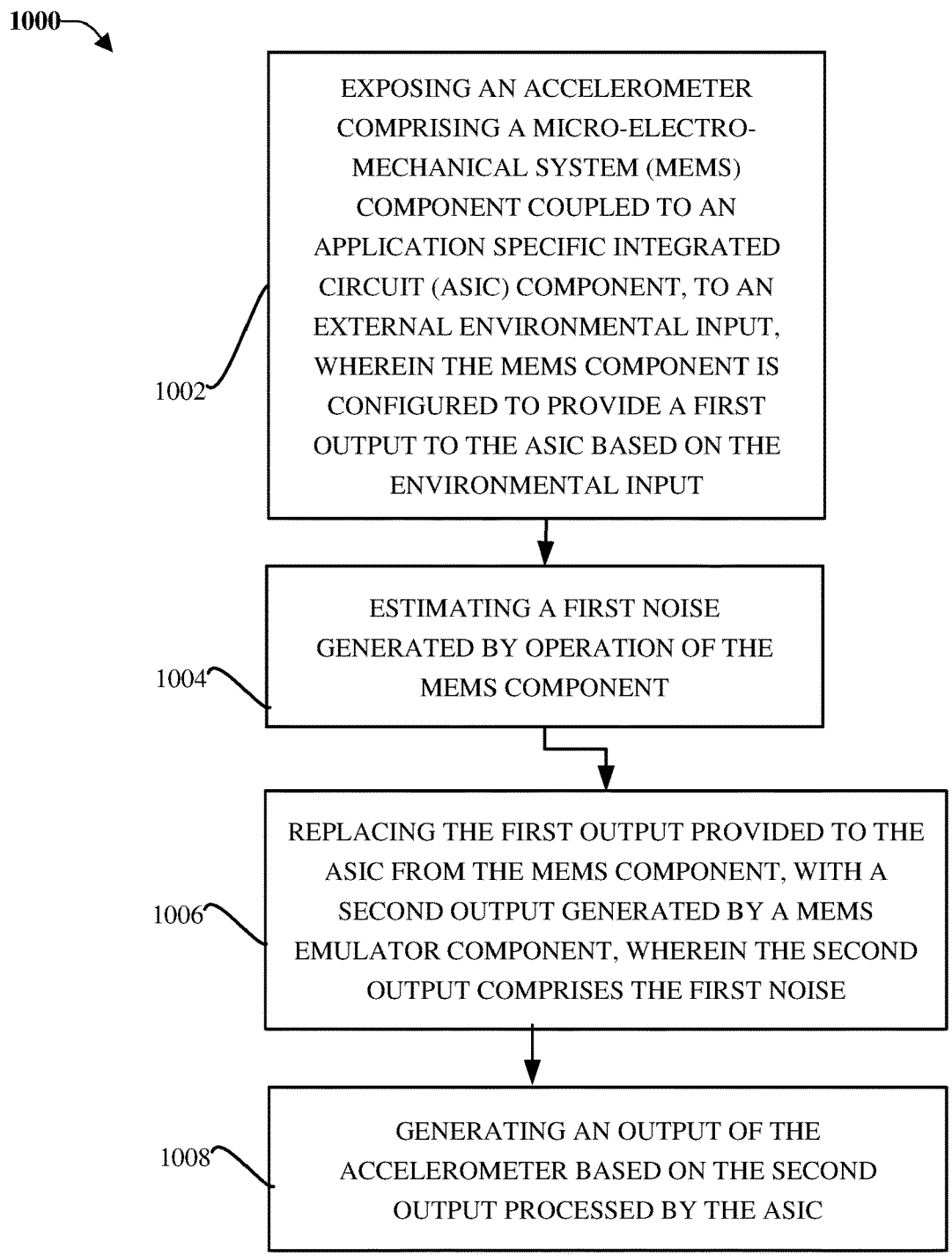
FIG. 10 illustrates another example flow diagram for a method that can facilitate determining a noise level of accelerometer, in accordance with one or more embodiments.

FIG. 10 illustrates another example flow diagram for a method 1000 that can facilitate determining a noise level of accelerometer 110, in accordance with one or more embodiments. For purposes of brevity, description of like elements and/or processes employed in other embodiments is omitted.

At 1002, example method 1000 can expose an accelerometer comprising a micro-electro-mechanical system (MEMS) component coupled to an application specific integrated circuit (ASIC) component, to an external environmental input, with the MEMS component being configured to provide a first output to the ASIC based on the environmental input. For example, method 1000 can expose accelerometer 110 comprising a micro-electro-mechanical system (MEMS) component 112 coupled to an application specific integrated circuit (ASIC) 115 component, to an external environmental input (e.g., environmental noise 220), with the MEMS component being configured to provide a first output to the ASIC based on the environmental input.

At 1004, example method 1000 can estimate a first noise generated by operation of the MEMS component. For example, method 1000 can estimate (e.g., by noise estimating component 660) a first noise generated by operation of the MEMS component, e.g., MEMS noise estimate 540. At 1006, example method 1000 can replace the first output provided to the ASIC from the MEMS component, with a second output generated by a MEMS emulator component, resulting in the second output comprising the first noise. For example, method 1000 can replace the first output provided to ASIC 115 from the MEMS component 112, with a second output generated by a MEMS emulator component 510, resulting in the second output comprising the first noise. At 1008, example method 1000 can generate an output of the accelerometer based on the second output processed by the ASIC. For example, method 1000 can generate an output 135 of accelerometer 110 based on the second output (e.g., from MEMS emulator component 510) processed by ASIC 115.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments. Moreover, while the various embodiments are susceptible to various modifications and alternative constructions, certain illustrated implementations thereof are shown in the drawings and have been described above in detail. It should be further understood, however, that there is no intention to limit the various embodiments to the specific forms disclosed, but on the contrary, the intention is to cover all modifications, alternative constructions, and equivalents falling within the spirit and scope of the various embodiments.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What has been described above includes examples of the embodiments of the subject disclosure. It is, of course, not possible to describe every conceivable combination of configurations, components, and/or methods for purposes of describing the claimed subject matter, but it is to be appreciated that many further combinations and permutations of the various embodiments are possible. Accordingly, the claimed subject matter is intended to embrace all such alterations, modifications, and variations that fall within the spirit and scope of the appended claims. While specific embodiments and examples are described in subject disclosure for illustrative purposes, various modifications are possible that are considered within the scope of such embodiments and examples, as those skilled in the relevant art can recognize.

As used in this application, the terms "component," "module," "device" and "system" are intended to refer to a computer-related entity, either hardware, a combination of hardware and software, software, or software in execution. As one example, a component or module can be, but is not limited to being, a process running on a processor, a processor or portion thereof, a hard disk drive, multiple storage drives (of optical and/or magnetic storage medium), an object, an executable, a thread of execution, a program, and/or a computer. By way of illustration, both an application running on a server and the server can be a component or module. One or more components or modules scan reside within a process and/or thread of execution, and a component or module can be localized on one computer or processor and/or distributed between two or more computers or processors.

As used herein, the term to "infer" or "inference" refer generally to the process of reasoning about or inferring states of the system, and/or environment from a set of observations as captured via events, signals, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the words "example" or "exemplary" is used herein to mean serving as an example, instance, or illustration. Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while an aspect may have been disclosed with respect to only one of several embodiments, such feature may be combined with one or more other features of the other embodiments as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. An accelerometer, comprising:
an electronic sensing component;
a micro-electro-mechanical system (MEMS) component associated with the electronic sensing component, wherein the MEMS component receives environment noise and external acceleration;
a MEMS emulation component configured to emulate the MEMS component;
a noise estimating component configured to:
generate an estimate of Brownian noise of the MEMS component;
replace a first output of the accelerometer, with a second output of the accelerometer generated by the MEMS emulation component, wherein the second output comprises a sum of the noise associated with the electronic sensing component and the estimate of the Brownian noise, wherein estimating the Brownian noise comprises:
applying a step signal to the MEMS component, and determining a resonant frequency and a quality factor characteristic of the MEMS component by applying a least square fit method to a response by the MEMS component to the step signal.

2. The accelerometer of claim 1, wherein the estimate of Brownian noise comprises an estimate of Brownian noise generated by operation of the MEMS component.

3. The accelerometer of claim 1, wherein the noise estimating component is configured to generate the estimate of the Brownian noise when a switch connects the MEMS component to the electronic sensing component and disables the MEMS emulation component from the electronic sensing component.

4. The accelerometer of claim 1, wherein the noise estimating component generates the estimate of the Brownian noise based on characteristics of the MEMS component.

5. The accelerometer of claim 4, wherein the characteristics of the MEMS component comprise a size of an actuator of the MEMS component.

6. The accelerometer of claim 1, wherein the environment noise comprises the environment noise during production of the accelerometer.

7. A method, comprising:
exposing an accelerometer comprising a micro-electro-mechanical system (MEMS) component coupled to an application specific integrated circuit component (ASIC), to an external environmental input, wherein the MEMS component is configured to provide a first output to the ASIC based on the external environmental input;
estimating a first noise comprising estimated Brownian noise generated by operation of the MEMS component;

replacing the first output provided to the ASIC from the MEMS component, with a second output generated by a MEMS emulator component, wherein the second output comprises the first noise; and generating an output of the accelerometer based on the second output processed by the ASIC, wherein estimating the first noise comprises:
  applying a step signal to the MEMS component, and
  determining a resonant frequency and a quality factor characteristic of the MEMS component by applying a least square fit method to a response by the MEMS component to the step signal.

8. The method of claim 7, wherein the estimating the first noise is further based on characteristics of the MEMS component comprising a size of an actuator of the MEMS component.

9. The method of claim 7, wherein the output of the accelerometer further comprises a second noise resulting from the processing of the second output by the ASIC.

10. The method of claim 9, wherein the second noise comprises electrical noise resulting from the processing of the second output.

11. The method of claim 7, wherein the output of the accelerometer comprises a noise level of the accelerometer.

12. The method of claim 11, wherein the noise level of the accelerometer comprises the noise level during production of the accelerometer.

13. The method of claim 7, wherein the second output generated by the MEMS emulator component comprises an emulation of output of the MEMS component without exposure of the MEMS component to the external environmental input.

* * * * *